Jan. 10, 1967    F. H. MAGNUS    3,296,732
CASTING RIG
Filed May 14, 1964    2 Sheets-Sheet 1
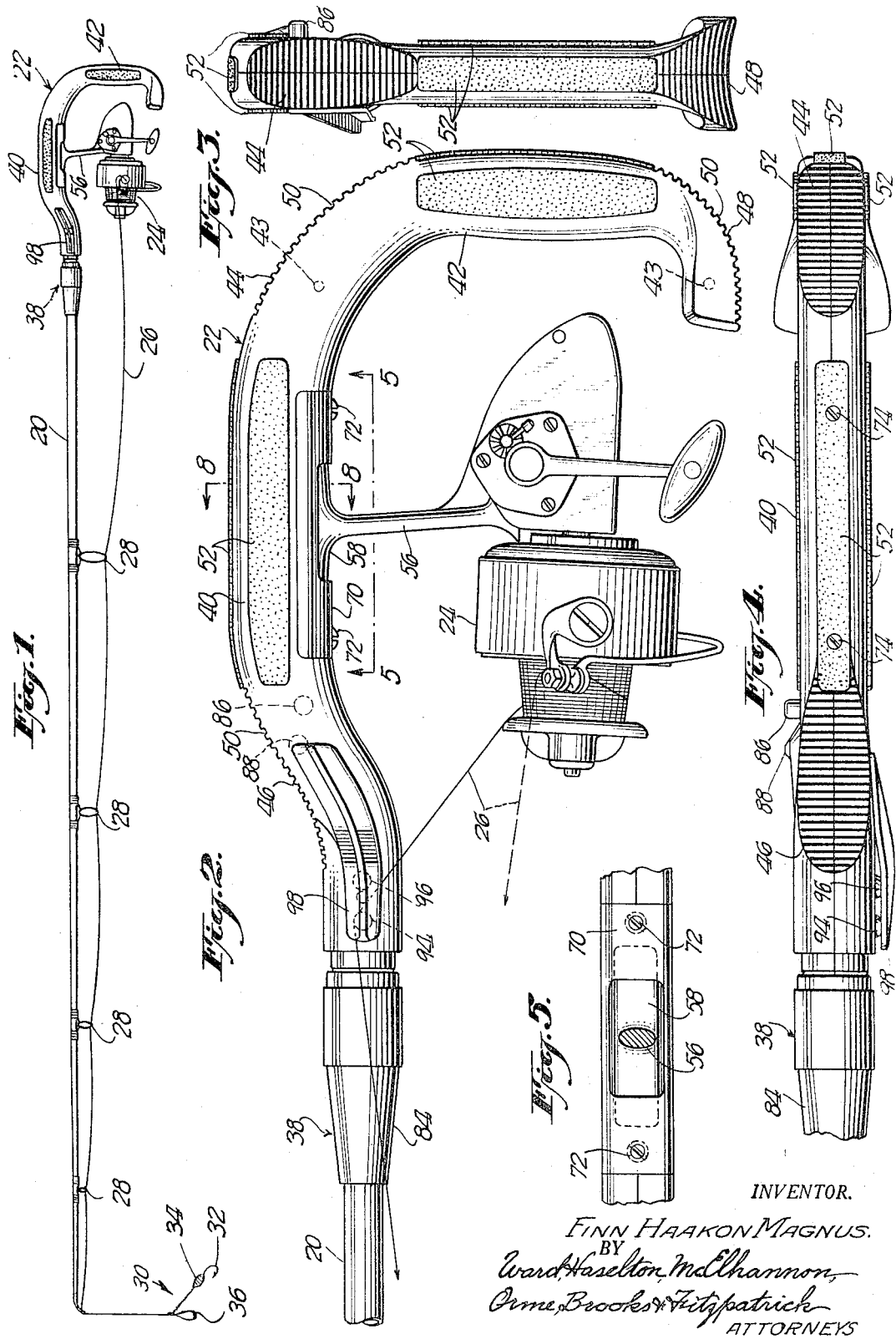
INVENTOR.
FINN HAAKON MAGNUS.
BY
Ward, Haselton, McElhannon,
Orme, Brooks & Fitzpatrick
ATTORNEYS

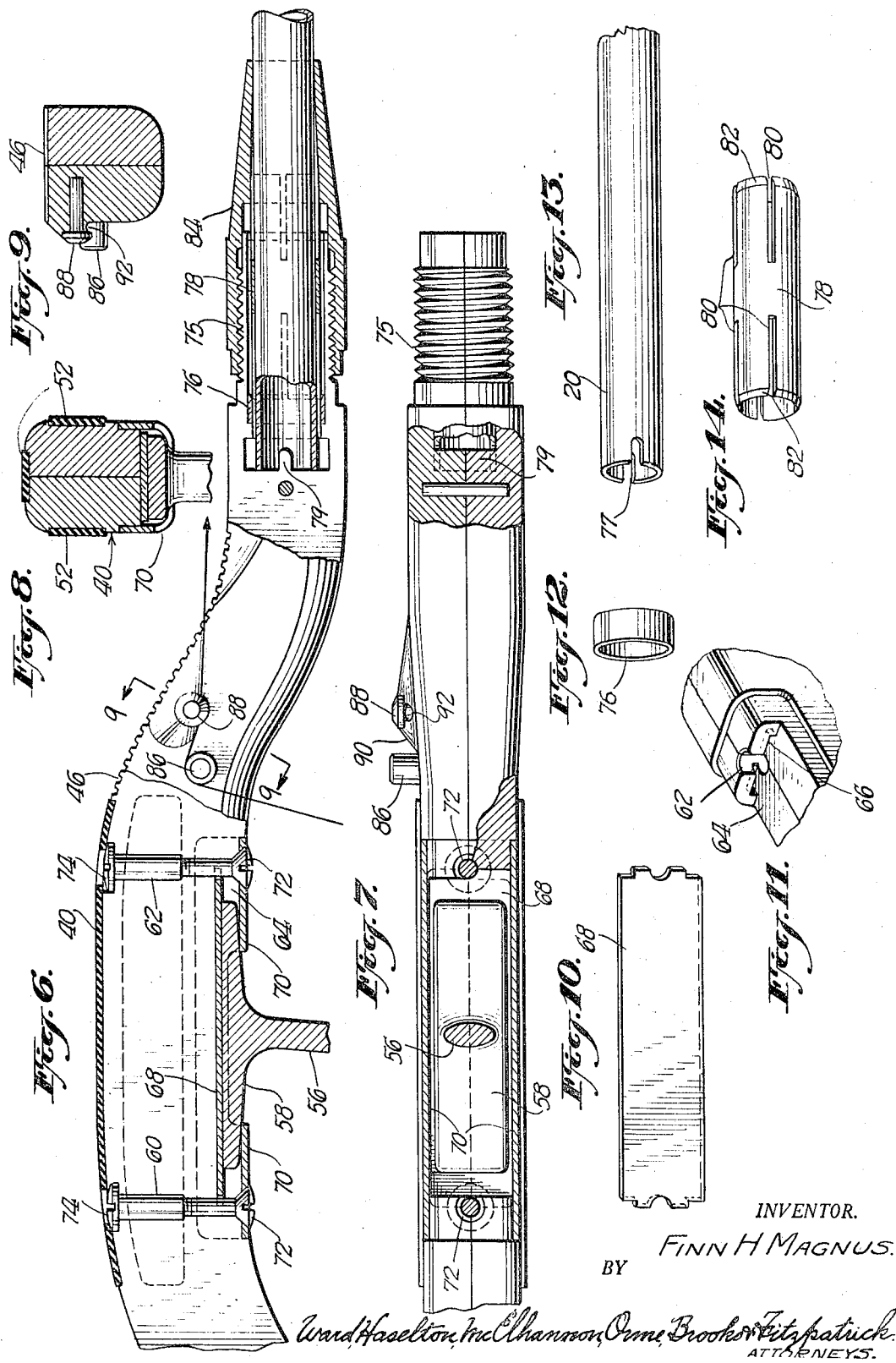

United States Patent Office 3,296,732
Patented Jan. 10, 1967

3,296,732
CASTING RIG
Finn H. Magnus, Washington Valley Road,
Morristown, N.J. 07960
Filed May 14, 1964, Ser. No. 367,596
4 Claims. (Cl. 43—23)

This invention relates to fishing equipment and more particularly it concerns an improved casting rig of the rod and reel variety.

In the field of angling, it has come to be recognized that the probability of obtaining a "strike" or of hooking a fish, is, to a large extent, dependent upon the distance and accuracy with which the bait and hook are thrown. It has not, however, been recognized that this distance and accuracy are greatly dependent upon the balance and handling characteristics of the rod and reel used in making each cast. Neither has it been appreciated that the balance and handling characteristics of a fishing rig have a very great influence both upon the deftness with which a fish, once hooked, may be fought, and upon the amount of fatigue, with consequent loss of dexterity, engendered in making each cast and fighting a hooked fish.

According to one feature of the present invention there is provided an improved casting rig which, for a given amount of strength and fishing experience, permits far greater accuracy and distance in casting than has heretofore been considered attainable.

According to another feature of the invention the ease and dexterity with which a fishing rig may be manipulated in the hooking and fighting of fish is greatly increased.

These and other features are achieved according to the present invention in a fishing rig which is characterized by unique balance and handling characteristics not heretofore found in such equipment.

These unique handling and balance characteristics are obtained in one aspect by providing a unique handle and reel arrangement wherein the handle extends horizontally only a short distance behind the reel and then terminates in a generally downwardly extending portion. In a specific arrangement this downwardly extending portion may take the form of a handgrip which is connected to the horizontal portion of the handle in a longitudinally curved but transversely flattened thumb rest portion. The downwardly extending portion may additionally be used as a body rest for greater handling ease in fighting and reeling.

In one form of the invention, the horizontal portion of the handle may itself be provided with a handgrip. The relative orientation of a horizontal and a vertical handgrip has been found to provide surprising improvement in both the distance and accuracy in two handed casting. The handgrips provided in accordance with the present invention may be of generally rectangular cross section with rounded corners and cushion inlays along their flat regions so as to relieve wrist, hand and finger stresses to the greatest extent possible.

In a further aspect the present invention provides for improved handling by means of a unique automatic line release mechanism which frees the thumb and fingers from the fishing line during the execution of a cast. This novel line release mechanism comprises a pair of protruding elements which extend transversely from the handle member. The location of the elements is such that the fishing line from the reel when looped over them is in a position such that it cannot be pulled from the reel under longitudinal tension. One of the protruding elements is tapered however so that when the line is placed under sufficient tension it is caused to slip off the other element and to resume its normal position relative to the reel.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a side view of a fishing rig which forms an embodiment of the present invention;

FIG. 2 is an enlarged view of the handle portion of the embodiment of FIG. 1;

FIG. 3 is an end view of the embodiment shown in FIG. 2;

FIG. 4 is a bottom view of the handle portion shown in FIG. 2;

FIG. 5 is a section view taken along line 5—5 of FIG. 2;

FIG. 6 is an enlarged fragmentary view, partially in section, illustrating a section of the handle portion of FIG. 2 from the opposite side;

FIG. 7 is a bottom view of the handle arrangement shown in FIG. 6;

FIG. 8 is a section view taken along line 8—8 of FIG. 2;

FIG. 9 is a section view taken along line 9—9 of FIG. 6;

FIG. 10 is a perspective illustrating a shim member utilized in connection with the embodiment of FIG. 1;

FIG. 11 is a fragmentary perspective illustrating a portion of the reel atachment arrangement of the embodiment of FIG. 1;

FIG. 12 is a perspective view of a ring member utilized in connection with the pole attachment mechanism of the embodiment of FIG. 1;

FIG. 13 is a fragmentary perspective view illustrating a section of the pole portion of the embodiment of FIG. 1; and FIG. 14 is a perspective view illustrating a clamping member utilized in connection with a pole attachment feature of the embodiment of FIG. 1.

The fishing rig shown in FIG. 1, is seen to include a flexible tapered rod member 20 attached to a formed handle member 22. This in turn supports a spinning reel 24. The tapered rod member 20, as in conventional fishing rigs, is of a flexible material such as glass fiber so as to provide a certain "action" necessary in controlling the movements of the bait when enticing a fish, and in minimizing the effect of sudden surges by the fish after it has been hooked. A line 26 extends from the reel 24 and through a series of guide rings 28 disposed along the rod member; and terminates at a lure arrangement 30. Such lure arrangement may include a hook 32, bait 34 and sinker or ballast means 36.

The rod member 20 is detachably secured to the formed handle portion 22 by means of a unique clamping arrangement 38 which permits various rods of different weight and flexibility characteristics to be used in conjunction with the same handle member. The details of both the construction and operation of the clamping arrangement 38 are described more fully hereinafter.

The formed handle member 22 is constructed with a horizontal handgrip 40 and a vertical handgrip 42, disposed so as to partially encircle the spinning reel 24. The significance of this particular arrangement of handgrips and their relationship to the reel 24 will become apparent from the following detailed description of these parts.

The construction of the handle member 22 is best shown in the enlarged views of FIGS. 2, 3 and 4. As shown in these drawings the handle member 22 is molded from suitable material such as plastic. For convenient fabrication it may be split longitudinally and formed separately in two halves which are held together by means of bolts or rivets 43 distributed therealong. Or, if desired, the two halves may be cemented together. As shown, the handle member is generally elongated in shape and is bent to a generally cane handled configuration, with the horizontal and vertical handgrips 40 and 42 interconnected by a curving thumb rest portion 44. Additional thumb rests 46 and 48 of similar configuration are provided at the opposite end of each handgrip. It will thus be appreciated that no matter what hand is used on either handgrip or in which direction the handgrip may be held there is always present a comfortable convenient downward curving thumb rest. These thumb rests, as shown in FIG. 3, have an outer transverse contour which is flat or slightly concave as opposed to the generally convex outer transverse contour of the handgrips 40 and 42. It has been found that this permits a more secure and comfortable grip than conventional arrangements provide. Also it relieves a great deal of the hand and wrist muscle tension so that a longer cast and a more accurate cast is made possible. The thumb rests 44, 46 and 48 may be transversely serrated as shown at 50, these serrations serving the dual purpose of improving the overall appearance of the rig and simultaneously enhancing the comfort and securability of the thumb rests.

As shown in FIGS. 2, 3 and 8, the handgrips 40 and 42 have a generally rectangular cross sectional contour with rounded corners. The flat portions of the handgrips are inlaid with strips 52. These inlaid strips, in combination with the generally rectangular outer contour of the handgrips, provide a maximum of comfort so as to permit prolonged use of the rig without undue strain on the hands of the user.

The spinning reel 24 is connected via a pedestal 56 to an elongated base portion 58 which is clamped to the handle member 22 approximately midway of the horizontal handgrip 40. It will be noted that the reel extends to a point such that its center of gravity is approximately on a line between the tip of the pole member 20 and the center of the vertical handgrip 42. This provides a great degree of flexibility to the rig in that it maintains balance irrespective of whether the rig is used in its normal position as shown or in an inverted position with the reel above the horizontal handgrip 40.

The manner in which the base portion 58 of the reel 24 is secured to the handgrip 40 is best illustrated in FIGS. 5–11. As shown in FIG. 6 the horizontal handgrip 40 is bored at 60 and 62 near each end thereof. There is provided at the underside of the horizontal handgrip 40, a recess 64, such as shown in FIG. 11. This recess extends between the center lines of each of the bores 60 and 62 and fully across the width of the handgrip 40. Further undercuts 66 are provided at either end of the recess 64 and extend to the outer points of the circumference of each of the bores 60 and 62. These undercuts are utilized to maintain a flat shim 68 in position along the floor of the recess 64. This shim as shown in FIG. 10 is shaped to conform to the floor of the recess 64 and the undercut 66 at either end thereof. The purpose for the shim 68 is to prevent gouging or marring of the plastic material forming the body of the handgrip 40, by the base 58 of the reel 24 when it is secured in place.

As shown in FIG. 6 the reel base 58 is placed against the shim 68 and then a metal clamping piece 70 is placed over the base and is secured thereto by means of male and female screw elements 72 and 74 which extend within the bores 60 and 62. The clamping piece is transversely curved to conform generally to the contour of the horizontal handgrip 40. The clamping piece is further cut out as at 73 to provide access to the base 58 of the reel. It will be appreciated that the reel may be installed without requiring complete removal of the clamping member. All that is required is to loosen the screw elements 72 and 74, position the reel base under the clamping piece and retighten the screws.

As stated previously the rod member 20 is detachably secured to the handle member 22 of the rig by means of the attaching or clamping device 38 which may easily be unlocked so as to permit quick and convenient interchange of rod members of different weights and lengths. The construction of the unique clamping arrangement 38 is most clearly shown in FIGS. 6, 7 and 12–14. As shown in FIGS. 6 and 7 the tip of the handle member 22 extends horizontally out beyond the downward extension of the front thumb rest 46 and terminates in the cylindrical threaded section 75. This threaded section, as shown in FIG. 6, is counterbored to receive the base end of the pole member 20. It will be noted from FIG. 13 that the pole member is provided with slots 77 which extend longitudinally for a short distance up from its base end. These slots locate over a protruding key 79 at the base of the counterbore in the handle member 22. This serves to prevent relative rotation of the pole and handle portions.

Prior to insertion of the slotted base end of the pole member 20 into the counterbore of the handle member 22, there is placed thereover a ring member 76 (FIG. 12) and a tubular shaped clamping member 78 (FIG. 14). The clamping member, as shown, is provided with longitudinal slots 80 which extend inwardly from either end thereof. The ends of the clamping member are chamfered as at 82. It will be noted that the clamping member fits snugly within the counterbore of the handle member 22 with the chamfer 82 at its inner end abutting the front edge of the ring 76 so that when the clamping member is pressed longitudinally against the ring its inner portions are caused to wedge between the ring and the pole member so as to effect a locking of the inner end of the pole member to the handle member. This inward pressing of the clamping member 78 is produced by means of a tubular locking member 84 which threadedly engages the threaded section of the handle portion 22. The locking member is provided with a tapered inner diameter portion which engages the outer end of the clamping member. Thus as the locking member is tightened on the threaded section of the handle it will cause wedging of both ends of the clamping member 78 so that it squeezes down upon the pole member 20 at two points. In this manner there is provided a very secure fastening of the pole member 20 to the handle member 22. Also the fastening may easily be released simply by unscrewing the locking member 84. This removes pressure from the clamping member 76 and allows the pole member 20 to be slipped out from the handle member so that it may be replaced by a different pole member. It should be noted that by providing clamping members with end and center portions of various thicknesses, the handle may be adapted to accommodate poles of various end diameters.

In order to permit proper gripping of the handle 22 during the execution of a cast there are provided means for obtaining automatic line release at a given point during the casting maneuver. This allows the user's wrist and arm to be oriented properly so as to be completely under control during the entire cast. As a result there is provided a further improvement of casting accuracy through reduction of strain and fatigue.

The structural elements which provide this automatic line release feature are best shown in FIGS. 6, 7 and 9. As shown in these drawings, there is provided on the side of the handle member 22 just under the downwardly curving front thumb rest 46, a protruding stud 86. The portion of the line 26 between the reel 24 and the guide rings 28 on the rod member 20 is brought up over the stud 86 so that the line initially leaves the reel in a direction nearly perpendicular to the reel axis rather than parallel thereto as in the conventional case. The significance of this is that the line now cannot be withdrawn from the reel by being pulled in this direction.

Immediately ahead of the protruding stud 86 there is provided a tapered line release element 88 having a lateral surface 90 which begins at the side of the handle member 22 just ahead of the protruding stud 86 and proceeds forwardly and outwardly to a point as far out from the side of the handle as the protruding stud. The line from the stud is hooked under the line release element 88 and lies in a groove 92 provided thereunder to help maintain it in place.

During the execution of a cast the rod tip is thrust forward through an arc shaped path. The centrifugal forces developed on the lure arrangement at the end of the line produce tension in the line, which, while looped over the protruding stud 86 cannot be released from the reel 24. As the velocity at the rod tip increases and the tension on the line becomes greater, it is pulled against the tapered lateral surface 90 of the line release element 88. This causes the line to be moved transversely toward the outer tip of the protruding stud 86. When the velocity of the rod tip produces sufficient tension on the line to cause it to move out to the tip of the protruding stud 86, the line releases from the stud and extends directly from the reel to the guide rings 28 on the pole. Since the line is then in a direction parallel to the axis of the reel it is free to come off from the reel as in normal casting procedure. It will be appreciated that with this arrangement the line is automatically released at precisely the proper instant in the cast so as to obtain maximum distance and accuracy. Moreover, there being no need for finger manipulation of the line during this operation, the person making the cast need concentrate only on holding the handle and moving it through a desired path. Also, his grip on the handle is complete and secure and need not be varied during the cast.

Referring now to FIG. 4, there will be seen a line drop back mechanism provided at the side of the handle member 22 just ahead of the forward thumb rest 46. This line drop back mechanism includes first and second protruding elements 94 and 96 positioned one ahead of the other along the side of the handle 22, and a resilient plate 98 mounted cantilever fashion to the handle just behind the protruding elements and extending over and pressing against them. When the bait is fully played out a little extra length of line is drawn from the reel and looped over the first protruding element and under the second. It has been found that very often a fish will nibble and give a slight tug on bait before actually taking it. Should the bait be subject to the resilient flexibility of the rod, as in the normal case, the bait will spring back in response to the initial tug. Such action will repell a more wary fish. The arrangement described avoids this situation; for when an initial tug is experienced by the line, it pulls loose from the drop back mechanism by slipping off the protruding elements and out between their ends and the resilient plate. This results in a bait action which is far more natural than the aforedescribed spring back action; and it has been found very effective in the obtaining of full fledged strikes from wary fish.

It will of course become readily apparent to those knowledgeable in various other sporting and manually demanding endeavors, that the concept of the present invention is readily applicable to a great many devices other than casting rigs. Thus for example it is believed that the invention will ultimately bring considerable improvement in the play of golf, baseball, hockey and any other field where an object must be swung by means of an elongated handle.

Having thus described my invention with particular reference to the preferred form thereof, it will be obvious to those skilled in the art to which the invention pertains, after understanding my invention, that various other changes and modifications may be made therein without departing from the spirit and scope of my invention, as defined by the claims appended thereto.

What is claimed as new and desired to be secured by Letters Patent is:

1. A fishing rig comprising: an elongated handle formed with a first substantially horizontal portion and a second generally vertical portion extending from one end of said horizontal portion, a pole member, means detachably securing said pole member to extend generally horizontally from the other end of said horizontal portion of said handle member, said securing means comprising a tubular member having longitudinal slits at either end and fitted over said pole and within a bore in said handle member and an integrally tapered locking ring which screws onto said other end of said horizontal portion and bears down against said tubular member causing same to wedge between and lock said pole member to said handle member, a reel having a pedestal separating an operative portion thereof from a longitudinal base, means detachably securing said base to said handle member ahead of said generally vertical portion, said last mentioned means comprising clamping elements which extend partially over said longitudinal base on said handle portion and partially directly over said handle portion and adjustable screw means for tightening said clamping elements toward said handle member, automatic line release means including a pair of transversely protruding elements extending from said handle member at a point ahead of said reel and arranged to cooperate with said reel to resist tensile forces on said line up to a preselected tension and thereafter to release said line, and automatic line drop back means comprising a pair of line pinching elements resiliently biased against each other to release a given quantity of line upon a line therebetween undergoing a given amount of tension.

2. A fishing rod handle comprising an elongated member formed with a horizontally extending portion and a generally vertical portion connected to one end of said horizontal portion, means for detachably mounting a reel on said handle at a position to be partially encircled by said horizontal and vertical portions, means for securing a pole member to extend out from the opposite end of said horizontal portion in a direction substantially parallel thereto, a line holding arrangement comprising guide elements extending from the side of said handle between said horizontal portion and said pole securing means, said line holding arrangement including means for retaining a line to pass therethrough between said reel and said pole member and to release said line in response to said line becoming tensioned by a preselected amount.

3. A fishing rod handle comprising an elongated member formed with a horizontal portion and a generally vertical portion connected at one end to said horizontal portion, means associated with said horizontal portion for detachably securing a spinning reel thereto at a point to be partially encircled by said horizontal and vertical portions, means supporting a pole member to extend generally parallel to and out from said horizontal portion of said handle, a protruding element extending outwardly from one side of said handle between said horizontal portion and such securing means and a further protruding element having an outwardly tapered lateral surface and an undercut lip for engaging a line passing between said first protruding portion and said pole member, whereby a preselected degree of tension on said line causes it to slip laterally and off from said protruding element.

4. A fishing rig comprising an elongated pole portion and an elongated handle portion, said handle portion including two elongated handgrips adapted to be grasped simultaneously by the left and right hands, respectively, of a user, said two handgrips being disposed at substantially right angles to each other, means mounting said pole portion to extend out from and substantially parallel to one of said handgrips, the other of said handgrips including an arcuate thumb rest portion at each end thereof, and means mounting a reel to extend out from said handle portion to a location where it becomes partially encircled by both said handgrips and where its center of gravity is substantially on a line between the tip of the pole portion and the center of the other handgrip.

References Cited by the Examiner

UNITED STATES PATENTS

| | | | |
|---|---|---|---|
| 834,711 | 10/1906 | Clark et al. | 273—81 |
| 1,283,015 | 10/1918 | Yung | 43—18 |
| 1,319,268 | 10/1919 | Caldwell | 43—20 |
| 1,898,323 | 2/1933 | Teetor | 43—23 |
| 1,931,303 | 10/1933 | Sturgis | 43—23 |
| 2,334,646 | 11/1943 | Price | 43—18 |
| 2,583,831 | 1/1952 | Goergen | 43—22 X |
| 2,737,747 | 3/1956 | Benson et al. | 43—23 X |
| 2,814,147 | 11/1957 | Henshaw | 43—22 |
| 2,839,863 | 6/1958 | Heffel | 43—22 |
| 3,060,617 | 10/1962 | Hamp | 43—18 |
| 3,080,673 | 3/1963 | Smith | 43—22 |

OTHER REFERENCES

Seidl, German printed application No. S 42,843, published Nov. 15, 1956.

SAMUEL KOREN, *Primary Examiner.*

W. H. CAMP, *Assistant Examiner.*